(12) United States Patent
Staddon et al.

(10) Patent No.: US 8,229,939 B2
(45) Date of Patent: *Jul. 24, 2012

(54) SERVER-IMPLEMENTED SYSTEM AND METHOD FOR PROVIDING PRIVATE INFERENCE CONTROL

(75) Inventors: Jessica N. Staddon, Redwood City, CA (US); David P. Woodruff, Cambridge, MA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 556 days.

This patent is subject to a terminal disclaimer.

(21) Appl. No.: 12/345,599

(22) Filed: Dec. 29, 2008

(65) Prior Publication Data

US 2009/0119518 A1     May 7, 2009

Related U.S. Application Data

(63) Continuation of application No. 10/969,549, filed on Oct. 19, 2004, now Pat. No. 7,472,105.

(51) Int. Cl.
*G06F 7/00* (2006.01)

(52) U.S. Cl. .......... 707/757; 707/781; 707/796; 280/28; 280/255

(58) Field of Classification Search .......................... None
See application file for complete search history.

(56) References Cited

U.S. PATENT DOCUMENTS 5,855,018 A * 12/1998 Chor et al. .................... 707/741
7,146,375 B2   12/2006 Egilsson et al.

OTHER PUBLICATIONS

Author: Bill Aiello, Yuval Ishai, Omer Reingold Title: Priced Oblivious Transfer: How to Sell Digital Good Date: Jul. 2, 2001 Publisher: SpringerLink Pertinent pp. 1-21.*
Naor et al., "Oblivious Transfer With Adaptive Queries," Springer-Verlag Berlin Heidelberg, pp. 573-590. (1999).
B. Aiello et al., "Priced Obvious Transfer: How to Sell Digital Goods, Advances in Cryptology-Eurocrypt" (2001).
B. Chor et al., "Private Infromation Retrieval," Proc. of FOCS (1995).
X. Qian et al., "Detection and Elimination of Inference Channels in Multilevel Relational Database Systems," Proc of IEEE Symp. on Research in Security and Privacy, pp. 196-205 (1993).
S. Goldwasser et al., "The Knowledge Complexity of Interactive Proof Systems," SIAM J. Comp., vol. 18(1), pp. 186-208 (1999).
S. Goldreich et al., "How to Play any Mental Game," Proc. of $19^{th}$ STOCL , pp. 218-229 (1987).

* cited by examiner

*Primary Examiner* — Fred I Ehichioya
*Assistant Examiner* — Anh Tai Tran
(74) *Attorney, Agent, or Firm* — Patrick J. S. Inouye

(57) ABSTRACT

A server system maintains records and their associated attributes in a secure database. A plurality of queries generated by encrypting indices identifying a records and their associated attributes, by homomorphic encryption is received from a client system. A secret key is generated at a certain query count and is divided into randomly generated key shares. A key share sequence is homomorphically encrypted. A table is formed by encrypting the indices, secret key and attributes. Query responses, which each comprise the attributes for each of the records of the table of entries are provided. The key shares are decrypted sufficient to recover the secret key subject to a non-inference enabling query.

16 Claims, 13 Drawing Sheets

SERVER-IMPLEMENTED SYSTEM AND METHOD FOR PROVIDING PRIVATE INFERENCE CONTROL

CROSS-REFERENCE TO RELATED APPLICATION

This patent application is a continuation of commonly-assigned U.S. patent application Ser. No. 10/969,549, filed Oct. 19, 2004, now U.S. Pat. No. 7,472,105, issued Dec. 30, 2008, the priority filing date of which is claimed, and the disclosure of which is incorporated by reference.

The U.S. Government has a paid-up license in this invention and the right in limited circumstances to require the patent owner to license others on reasonable terms as provided by the terms of Contract No. F30602-03-C-0037 awarded by DARPA.

FIELD

This application relates in general to secure information retrieval and, in particular, to a system and method for providing private inference control.

BACKGROUND

On-line databases, particularly databases available over a network, such as the Internet, can provide virtually unlimited access to various stored forms of information, whether by design or inadvertence. As a result, maintaining sensitive information securely in on-line databases has become increasingly important, especially in light of concerns over identity theft and compliance with medical information privacy laws. Ensuring the safety of sensitive information requires protecting the privacy interests of the user against unauthorized users and from the server seeing the user's queries.

Unauthorized users attempt to gain surreptitious access to sensitive information either directly or by inference. Direct access requires obtaining the sensitive information by circumventing security safeguards and compromising the data by direct attack. Inferential access is an indirect attempt to determine sensitive information through a sequence of queries of non-sensitive information whose answers, taken together, allow an improper inference to be drawn about the sensitive information. Such query sequences are known as inference channels. Access and inference control can respectively protect against direct or inferential sensitive information compromise by controlling each response to a query.

As repositories of the sensitive information, servers are generally viewed as disinterested in the nature of the sensitive information stored. However, the act of submitting a query to a server presents the possibility of a loss of privacy interests to an honest but "curious" server, where the user suffers a loss of privacy due to exposure of the query to the server. The mere fact of the attribute being searched, the frequency of searching and whether the response is blocked can be revealing, even if actual sensitive information is not compromised. Private information retrieval allows users to retrieve information from a server privately and without compromise due to queries.

Sensitive information must be safeguarded against compromise from unauthorized users, especially with respect to indirect means of compromise through inference channels. Similarly, a server is expected to safeguard against both unauthorized direct access and inference channels, even though the blocking of a query can remain secret. Thus, protecting the privacy interests of a user against unauthorized users and curious but honest servers creates a dilemma over how best to ensure that unauthorized users are not able to infer sensitive information without letting the server know what information is being retrieved.

U.S. Pat. No. 7,146,375, issued Dec. 5, 2006 to Egilsson et al., describes an inference control method in a data cube. Attributes used to determine how data is aggregated and viewed are rearranged by modifying hypercube realizations in such a way that modified schemes satisfy identity protection requirements for inference control. The same processes can also be used to enforce rewriting of hierarchies in such a way that modified structure reveals colorations and patterns in a dataset. However, the Egilsson reference fails to describe ensuring privacy of queries relative to an honest but curious server.

B. Aiello et al., "Priced Oblivious Transfer: How to Sell Digital Goods," Advances in Cryptology-Eurocrypt '01 (2001), describes an inference channel control scheme that associates prices with attributes of records. Buyers can successfully retrieve selected items as long as the buyers' balance contains sufficient funds. Items whose costs exceed the remaining budget cannot be retrieved and the vendor, that is, server, learns nothing except the amount of interaction and initial deposit amount. However, the inference channel control scheme provides a specific solution to a subclass of inference control problems and cannot be applied to an arbitrary subset of inference channels selected from a set of potentially searchable data.

B. Chor et al., "Private Information Retrieval," Proc. of FOCS '95 (1995), describes private inference control, whereby the server learns nothing about the query. However, the Chor reference fails to provide control over arbitrary inference channels.

X. Qian et al., "Detection and Elimination of Inference Channels in Multilevel Relational Database Systems," Proc. of IEEE Symp. on Research in Security and Privacy, pp. 196-205 (1993), describes a tool for assisting database designers in detecting and eliminating potential sources of inference problems in multilevel relational database schemas. Inferences can be blocked by upgrading the security classification of some foreign key relationships. However, the Qian reference fails to provide protection against a server seeing the user's queries.

Therefore, there is a need for providing secure control over inference channels in combination with private information retrieval.

SUMMARY

One embodiment provides a system and method for providing private inference control. A secure database is maintained and includes a plurality of records. Each record includes a plurality of attributes. A query is specified by encrypting indices identifying one such record and attribute by homomorphic encryption. A secret key is generated upon reaching a certain query count. The secret key is divided into randomly generated key shares and a sequence of the key shares is provided, which are each encrypted by homomorphic encryption. A table of entries is formed by encrypting the indices, the secret key and each of the attributes for each of the records of the database. The table is provided and a plurality of the key shares is decrypted sufficient to recover the secret key subject to a non-inference enabling query.

A further embodiment provides a system and method for providing private inference control. A query count and a secure database are maintained and include a plurality of records. Each record includes a plurality of attributes, wherein a set of the attributes forms one or more inference channels. A regular data structure is constructed including a set of ciphertext keys, which each relate to one such attribute and record in the secure database. A seed for a pseudorandom function and a secret key for non-malleable encryption are chosen. A query is specified by providing indices identifying one such record and attribute by homomorphic encryption and a secure function evaluation is executed dependent upon the inference channels, the seed, the secret key, the query count, and the set of ciphertext keys. An output is generated from the secure function evaluation including the pseudorandom function and an updated set of ciphertext keys subject to sum-consistency of the set of ciphertext keys and a non-inference enabling query. A table of entries is formed by combining each of the attributes for each of the records of the database with an output from the pseudorandom function as applied to the seed and the indices. The entry is provided from the table corresponding to the indices.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Private Inference Control Environment

Figure 1:
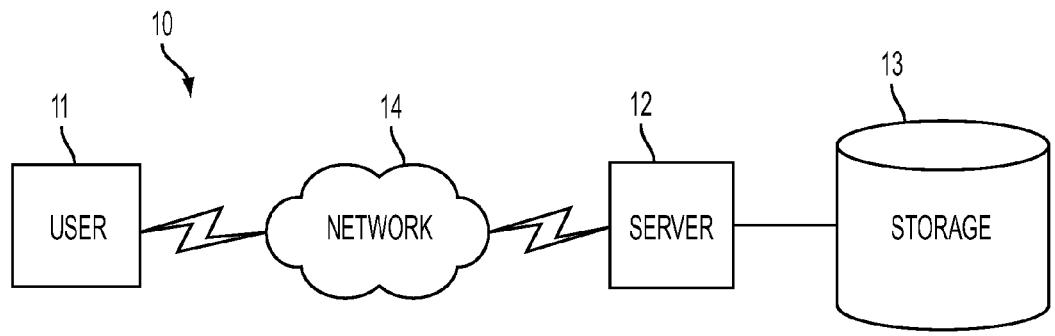
FIG. 1 is a block diagram showing, by way of example, a user system and a server system upon which private inference control is provided.

FIG. 1 is a block diagram 10 showing, by way of example, a user system 11 and a server system 12 upon which private inference control is provided. A user system 11 remotely accesses a server system 12 over a network 14, such as the Internet. The server system 12 is coupled to a storage device 13, in which a database storing sensitive information is maintained. Access to the sensitive information is provided through private inference control, as further described below beginning with reference to FIG. 2 et seq.

Preferably, the user system 11 and server system 12 are general-purpose computers executing operating system and providing an application execution environment. The user system 11 and server system 12 include components conventionally found in a personal computer or server, such as, for example, a central processing unit, display, keyboard, mouse, and various components for interconnecting these components. Program code, including software programs and data is loaded into memory for execution and processing by the central processing unit and results are generated for display, output, transmittal, or storage.

Overview

Two protocols for providing private inference control are described. In the first protocol, the server system 12 maintains state by storing encrypted information about the queries of each user system 11. In the second protocol, the server system 12 operates with minimal state and only maintains the cumulative total number of queries made by each user system 11. The protocols apply to single-server computationally-private inference control schemes. All users and servers execute efficient probabilistic algorithms.

For notational convenience, the following conventions will be followed:

For an integer m, [m] denotes the set $\{1, \ldots, m\}$. Further, let $2^{[m]}$ denote the set of all subset of [m].

For a vector s, $s_i$ refers to its ith coordinate, and if $s_i$ is itself a vector, $s_{i,j}$ denotes the ith coordinate of $s_i$. This notation is repeated indefinitely, so if $S_{i,j}$ is also a vector, $s_{i,j,k}$ denotes its kth coordinate. For $i \leq j$, let $s_{1,\ldots,j}$ denote the (j−i+1)-tuple $(s_i, s_{i+1}, \ldots s_{j-1}, s_j)$.

For two strings or vectors s and t, let s∞t denote their concatenation. Let |s| denote the length of s.

An arbitrary negligible function is denoted by $\eta(a,b)$, for example, a function of a, b, which is less than any inverse polynomial in a, b for a and b sufficiently large.

Two families of random variables $U_n$ and $V_n$ are computationally indistinguishable if, for all probabilistic polynomial time (PPT) algorithms A, $|P[A(U_n)=1] - Pr[A(V_n)=1]| < \eta(n)$.

The notation Õ suppresses terms that are polylogarithmic in the number of database records n.

All entries in the database are single bits, but the definitions can extend to handle entries in $\{0,1\}^l$ for constant l.

A database is a string $x \in (\{0,1\}^m)^n$. $x_i$ denotes the ith record of the database, and $x_{i,j}$ denotes the Ith attribute value of the ith record. In a general asymptotic analysis, the number of attributes, m, is at most O(log log n), whereas the number of records n is very large, as is the case for many relational databases.

Given the description of x, there is a mechanism for generating a collection C of sets $F \subseteq [m]$ denoting the inference channels in x. The meaning of $\overline{C}$ is that, for all $i \in [n]$ and $F \in C$, the user should not learn $x_{i,j}$ for all $j \in F$. We take C to be an input to the server.

C is monotone, that is, if $A \in C$ and $A \subseteq B$, then $B \in C$. C is nonempty and C is an input to the user.

A query sequence T of distinct pairs is permissible if the query sequence does not complete any inference channels, that is, for all $F \in C$ and all $i \in [n]$, there exists an $l \in F$, such that $(i,l) \notin T$. $T=T(U,x)$, where U denotes the code of U and T is a random variable induced by the uniform distribution on ρ and γ, where ρ and γ are random strings stored by the user system 11 and server system 12, respectively. If U is honest, T assumes a particular permissible query sequence for fixed ρ and γ.

Stateful Private Inference Control

The stateful private inference control protocol makes use of a homomorphic encryption function, $E^{hom}(\bullet)$. With $E^{hom}(\bullet)$ the user system 11 can privately send query information to the server system 12. Using the homomorphic property of $E^{hom}(\bullet)$, the server system 12 can encrypt a secret, S, in such a way that the user system 11 can only recover the sent S if the user system 11 is not in danger of making an undesired inference with the current query. Finally, the user system 11 and server system 12 engage in a secure private information retrieval (SPIR) protocol on a table encrypted under the sent key S and the encrypted query information sent by the user system 11. Hence, recovery of the sent key S effectively authorizes the user system 11 to receive the query answer.

User System for Providing Stateful Private Inference Control

Figure 2:
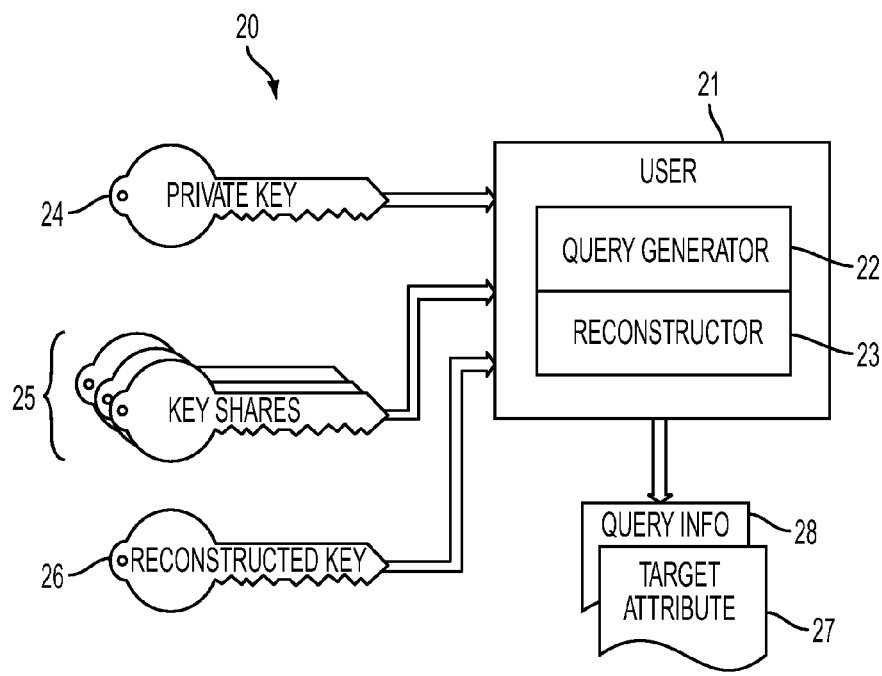
FIG. 2 is a block diagram showing a user system for providing stateful private inference control, in accordance with one embodiment.

FIG. 2 is a block diagram 20 showing a user system 11 for providing stateful private inference control, in accordance with one embodiment. The user system 21 generates a private key 24 and a public key (not shown) that is shared with the server system. The user system 11 includes a query generator 22 and reconstructor 23. The query generator 22 engages with the server system to execute a SPIR protocol based on query information 28 that is sent to the server system, as further described below with reference to FIG. 6. The reconstructor 23 identifies key shares 25 received from the server system to generate a reconstructed key 26 that is used to recover a target attribute 27, as further described below with reference to FIG. 10.

Server System for Providing Stateful Private Inference Control

Figure 3:
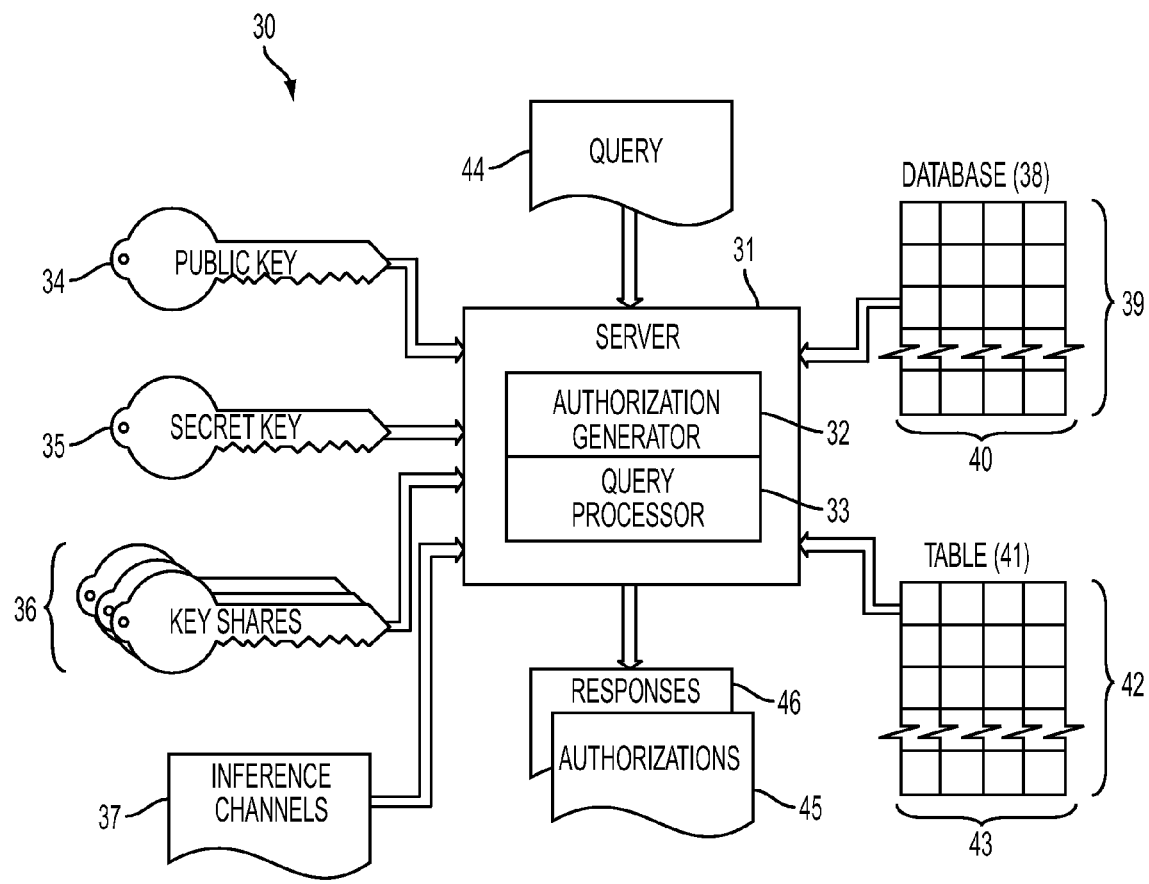
FIG. 3 is a block diagram showing a server system for providing stateful private inference control, in accordance with one embodiment.

FIG. 3 is a block diagram 30 showing a server system 12 for providing stateful private inference control, in accordance with one embodiment. The server system 31 stores the set of inference channels 37. The server system 31 receives a public key 34 from the user system 21 that has been generated from the private key 24. The server system 31 receives a query 44, consisting of the query information 28 homomorphically encrypted by the user system 21. The query 44 identifies a record 39 and attribute 40 stored securely in a database 38 maintained by the server system 31.

The server system 31 includes an authorization generator 32 and query processor 33. The authorization generator 32 generates a secret key 35 and randomly generated key shares 36, which are sent to the user system 21 as authorizations 45, as further described below with reference to FIG. 7. The query processor 33 forms a table 41 that includes records 42 and attributes 43, which correspond to the records 39 and attributes 40 of the database 38. The entries in the table 41 are provided to the user system 21 as responses 46 through execution of the SPIR protocol, as further described below with reference to FIG. 9.

Stateful Private Inference Control Method

Figure 4:
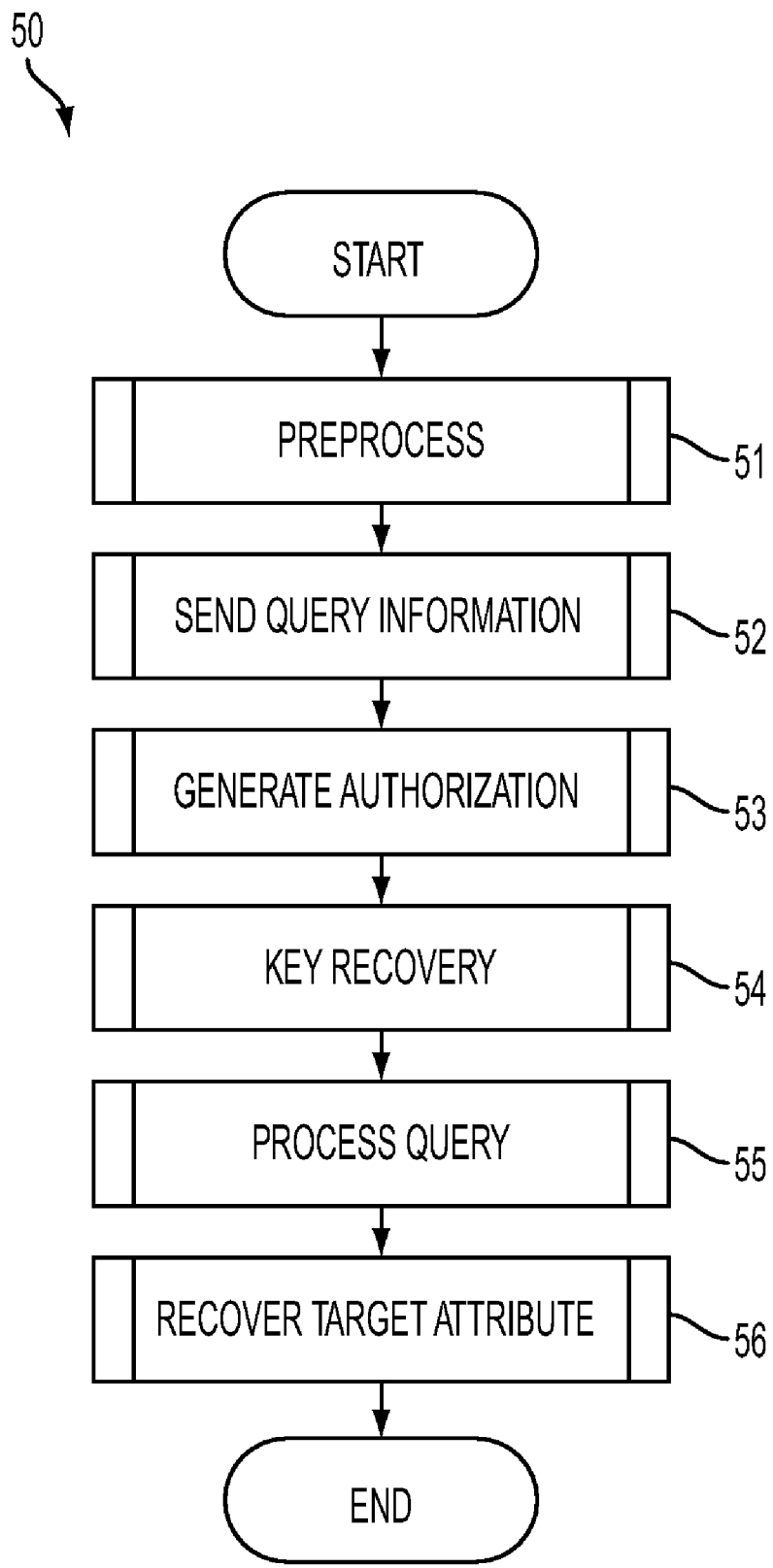
FIG. 4 is a flow diagram showing a method for providing stateful private inference control, in accordance with one embodiment.

FIG. 4 is a flow diagram 50 showing a method for providing stateful private inference control, in accordance with one embodiment. The purpose of the method is to provide private inference control by providing key shares 36 to a user system 21 which, in conjunction with authorizations 45, prevent the completion of inference channels 37 to unauthorized users while not revealing information to the server system 31. The method is described as a sequence of process operations or steps, which can be executed, for instance, by a user system 21 and server system 31.

Initially, the user system 21 performs preprocessing (block 51) to provide a public key 34 to the server system 31, as further described below with reference to FIG. 5. The user system 21 then sends query information 28 (block 52) to the server system 31, as further described below with reference to FIG. 6. In response, the server system 31 generates authorizations 45 (block 53), which are provided to the user system 21, as further described below with reference to FIG. 7. Upon receipt of a sufficient number of key shares 25, the user system 21 recovers a reconstructed key (block 54), as further described below with reference to FIG. 8. The server system 31 processes the query 44 (block 55), as further described below with reference to FIG. 9, and the user system 21 recovers the target attribute 27 (block 56), as further described below with reference to FIG. 10.

Preprocessing

Figure 5:
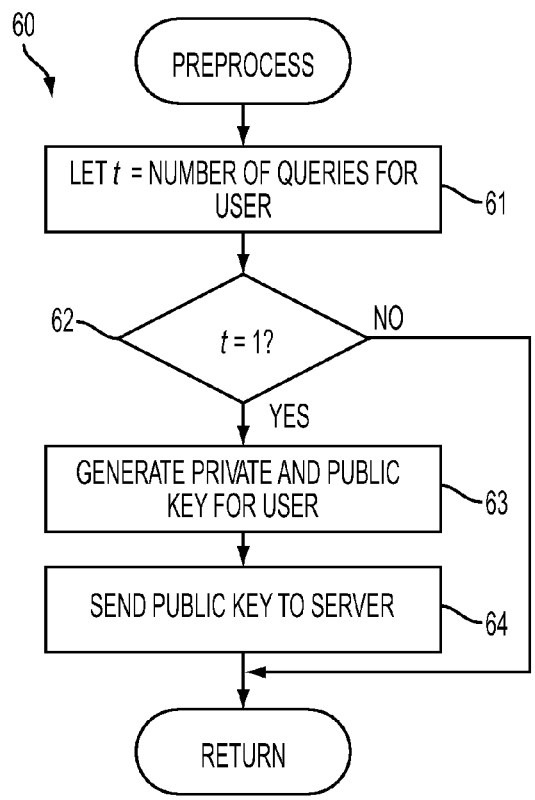
FIG. 5 is a flow diagram showing a routine for performing preprocessing for use in the method of FIG. 4.

FIG. 5 is a flow diagram 60 showing a routine for performing preprocessing for use in the method of FIG. 4. The purpose of this routine is to begin a query sequence by generating a private key 24 and public key 34.

The number of queries t is initialized (block 61). If the current number of queries t is equal to one (block 62), a private key 24 and public key 34 are generated by the user system 21 (block 63) and the public key 34 is sent to the server system 31 (block 64).

Sending Query Information

Figure 6:
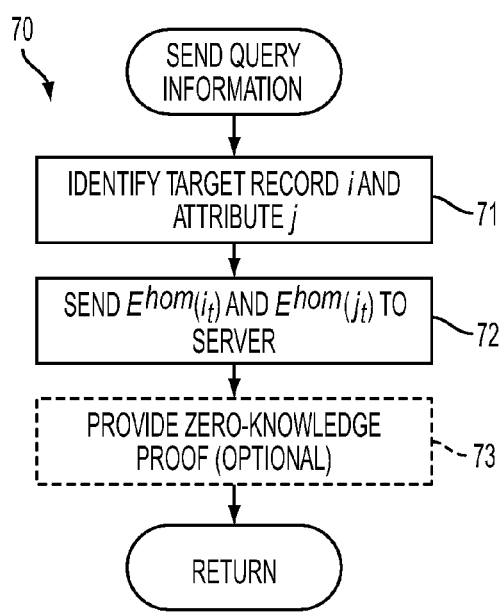
FIG. 6 is a flow diagram showing a routine for sending query information for use in the method of FIG. 4.

FIG. 6 is a flow diagram 70 showing a routine for sending query information 28 for use in the method of FIG. 4. The purpose of this routine is to send encrypted query information 28 to the server system 31 coupled with satisfactory proof of knowledge.

Initially, the user system 21 identifies a target record i and attribute j (block 71). The target record i and attribute j are homomorphically encrypted as $E^{hom}(i_t)$ and $E^{hom}(j_t)$ and are sent to the server system 31 (block 72). Finally, as an optional step, the user system 21 can execute a zero-knowledge proof of knowledge to demonstrate that the ciphertexts maintained in the database 38 are well-formed (block 73). Intuitively, a zero-knowledge proof of knowledge allows a prover to convince a verifier of some fact in zero-knowledge if and only if the prover knows something. Zero-knowledge proofs are described in S. Goldwasser et al., "The Knowledge Complexity of Interactive Proof Systems," SIAM J. Comp., Vol. 18 (1), pp. 186-208 (1999), the disclosure of which is incorporated by reference.

Generating Authorizations

Figure 7:
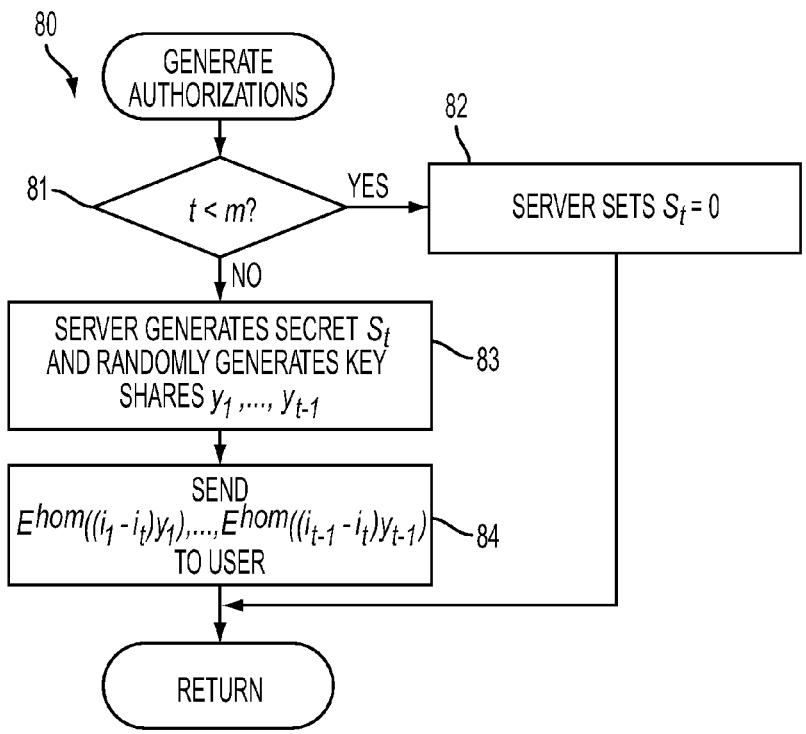
FIG. 7 is a flow diagram showing a routine for generating authorizations for use in the method of FIG. 4.

FIG. 7 is a flow diagram 80 showing a routine for generating authorizations 45 for use in the method of FIG. 4. The purpose of this routine is to generate the secret key 35 and to provide key shares 36 to the user system 21 as authorizations 45.

If the count of queries t is less than the number of inference channels m (block 81), the server system 31 sets the secret key as $S_t$ to zero (block 82). Otherwise, the server generates a secret key S, and randomly generates key shares $y_1, \ldots y_{t-1}$, (block 83). Finally, the server system 31 sends the key shares homomorphically encrypted with an index value as $E^{hom}((i-i_t)y_1), \ldots, E^{hom}((i_{t-1}-i)y_{t-1})$ to the user system 21 (block 84).

Key Recovery

Figure 8:
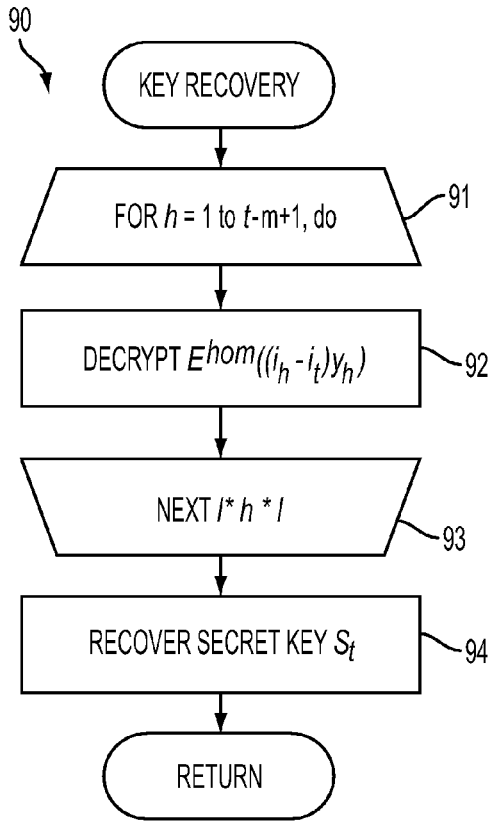
FIG. 8 is a flow diagram showing a routine for performing key recovery for use in the method of FIG. 4.

FIG. 8 is a flow diagram 90 showing a routine for performing key recovery for use in the method of FIG. 4. The purpose of this routine is to recover the secret key 35 upon receiving a sufficient number of key shares 36.

The key recovery is performed in an iterative processing loop (blocks 91-93) from 1 to t−m+1, that is, up to the query count t plus m less one. During each iteration, the user system 21 homomorphically decrypts the authorization $E^{hom}((i_h-i_t)y_h)$ (block 92). The user system 21 will be able to decrypt and recover at least t−m+1 of the key shares 36 in $\{y_1, \ldots, y_{t-1}\}$ if the user system 21 has made a permissible sequence of queries and will thus be able to recover the secret key $S_t$ (block 94).

Query Processing

Figure 9:
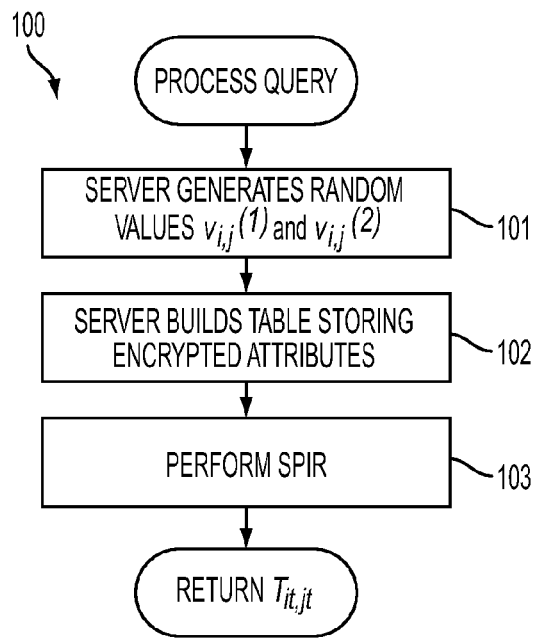
FIG. 9 is a flow diagram showing a routine for processing a query for use in the method of FIG. 4.

FIG. 9 is a flow diagram 100 showing a function for processing a query 44 for use in the method of FIG. 4. The purpose of this function is to build the table 41, from which query responses 46 are provided.

Initially, the server system 31 generates a pair of random values $v_{i,j}^{(t)}$ and $v_{i,j}^{(2)}$ for $1 \leq i \leq n$, $1 \leq j \leq m$ (block 101) which are used to perturb the corresponding attributes 40 stored in the database 38. The server system 31 then builds the table 41 by storing each of the attributes 40 as homomorphically encrypted attributes 43 formed as $\tau = (E^{hom}(v_{i,j}^{(1)}(j-j_t) + V_{i,j}^{(2)}(i-i_t) + S_t + x_{ij}))_{i,j}$ (block 102). The server system 31 receives the query information 28, and returns the encrypted attribute $T_{i_t,j_t}$ through execution of the SPIR protocol (block 103) with the user system 21.

Target Attribute Recovery

Figure 10:
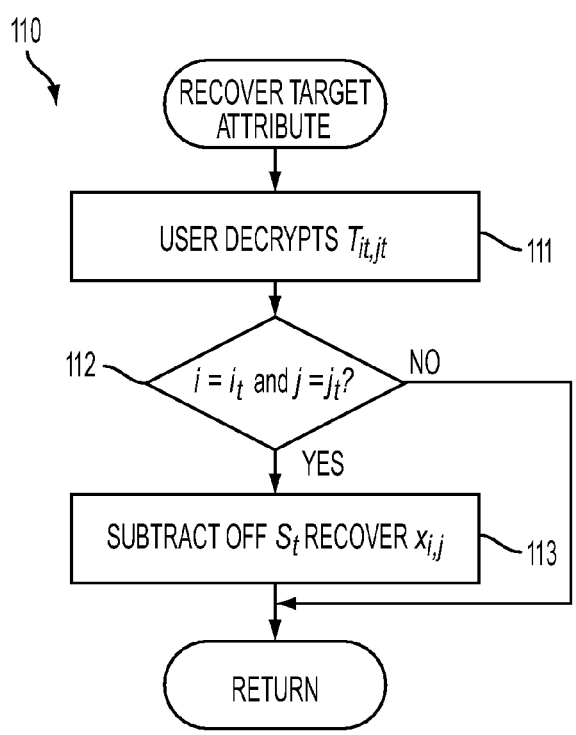
FIG. 10 is a flow diagram showing a routine for recovering a target attribute for use in the method of FIG. 4.

FIG. 10 is a flow diagram 110 showing a routine for recovering a target attribute 27 for use in the method of FIG. 4. The purpose of this routine is to recover the requested target attribute 27 from a table entry received through execution of the SPIR protocol with the server system 12.

Initially, the user system 21 homomorphically decrypts the encrypted attribute $T_{i_t,j_t}$ (block 111). If the record index i and attribute j index match the perturbed record index $i_t$ and attribute index $j_t$ (block 112), the corresponding parameters in the table $\tau = (E^{hom}(v_{i,j}^{(1)}(j-j_t) + V_{i,j}^{(2)}(i-i_t) + S_t + x_{ij}))_{i,j}$ are zeroed-out and the secret key $S_t$ can be subtracted to recover the target attribute $x_{i,j}$ (block 113).

Private Inference Control

Figure 11:
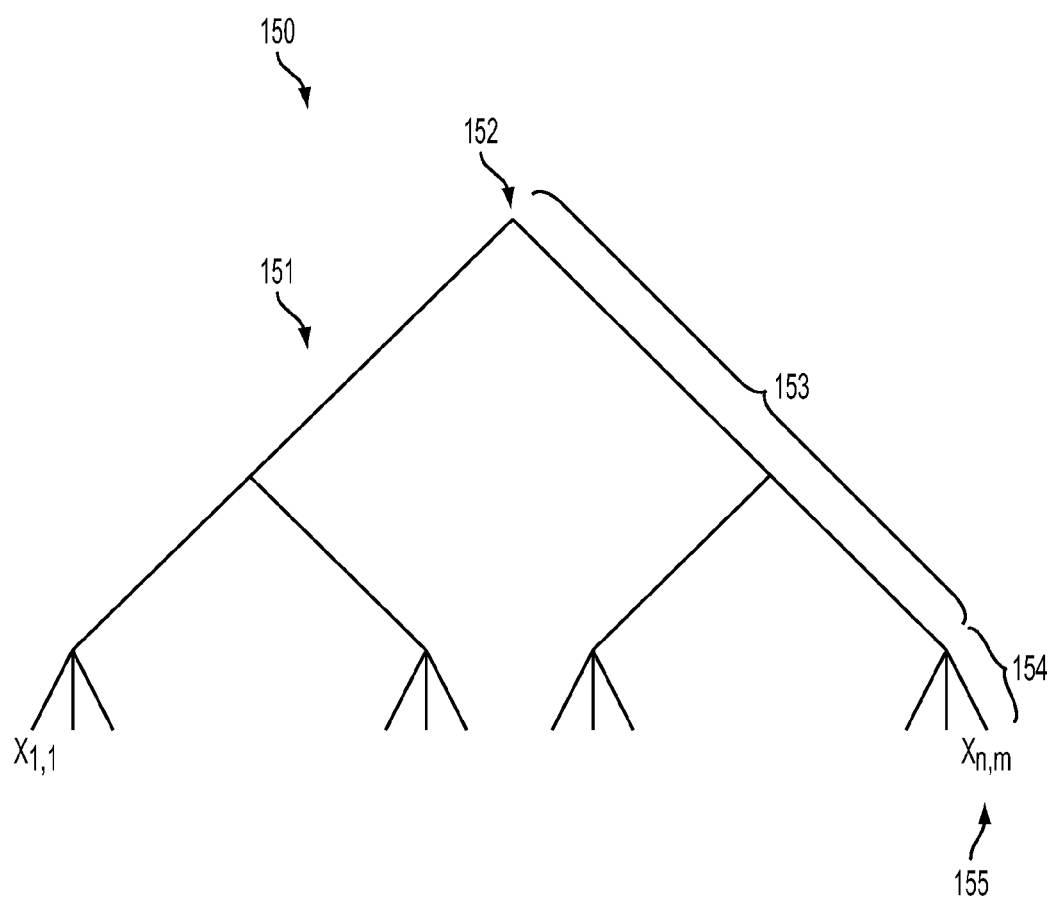
FIG. 11 is a data structure diagram showing, by way of example, a balanced binary tree containing database keys.

In accordance with a further embodiment, a private inference control protocol makes use of a balanced binary tree data structure to hierarchically store keys paired with a query count for an associated attribute in the database. FIG. 11 is a data structure diagram 150 showing, by way of example, a balanced binary tree 151 containing database keys. Without loss of generality, η is a power of 2. The balanced binary tree 151 has n leaves 153 beginning at a root node 152, where in addition, m children 154 are connected to each leaf of the binary tree 151. The leaves 155 denote entries $x_{i,j}$ of the database, and the parents of the leaves denote records x; The user system obtains keys K(w,z) associated with each leaf w indicating whether the value at the leaf has been accessed. Here, $z \in \{0,1\}$. Internal nodes w also have associated keys K(w,z), where z is an integer indicating the total number of times that the leaves in the subtree rooted at w have been accessed. The keys are used for inference control. When a user system retrieves a database entry, the keys are used to traverse the tree upwards. If the user system tries to use "older" keys indicating that nodes have been accessed fewer times the actual query count, the keys will be inconsistent with the server system knowledge of the total number of queries made and the user system will not be able to recover the desired database entry.

Notationally, α denotes the root of the binary balanced tree B. Node w∈B is at height d if node w is d levels above the leaves. The leaves are at height 0. Each node w in B of height l is denoted by i for some i[n], and each of the m children of i are denoted by (i,j) for some j∈[m]. For a non-root node w in B, let sib(w) denote w's siblings, which are either 1 or m−1. For a non-leaf node w, let children (w) denote w's children. For a leaf node w, let anc(w) denote the set of log n+1 ancestors along the path from w to α, inclusive. Node w is considered accessed whenever $x_{i,j}$ is successfully retrieved by the user system for which W∈ anc(i,j). Finally, for leaves w, the set of 2 log n+m−1 nodes that is the set of ancestors together with the siblings of the ancestors, the following relation is defined:

$$sibanc(w) = anc(w) \cup \{u | \exists v \in anc(w) s.t. u = sib(v)\}$$

When an honest user system queries $x_{i,j}$, the user system will use the set of keys $\pi = \{K(w,f_w) | W \in sibanc(i,j)\}$, where $f_w$ is the number of times w has been assessed. If the user system is dishonest, for some w∈sibanc(i,j), the user system may substitute K(w,z) in place of $K(w,f_w)$ for some integer $z \neq f_w$. With all but negligible probability, any dishonest user system cannot determine K(w,z), for any $z > f_w$, and if K(w,z) is substituted for $K(w,f_w)$, $z < f_w$, holds.

If the user system is given $x_{i,j}$, the user system will also obtain the updated set of keys $\pi = \{K(w,f_w) | w \in sibanc(i,j)\}$.

Inference control is enforced by sum-consistency. For any non-leaf node us and children nodes, children (w), the keys K(w,i), $\{K(u,j_u) | =u \in$ children(w)} are sum-consistent if $i = \Sigma_{u \in children(w)} j_u$. Suppose an honest system wants to retrieve $x_{i,j}$ on the (i+1)st query. The set of keys π gives a proof that the user system is not in danger of completing an inference channel. Indeed, if the user system is honest, π has the following three properties:

1. For each non-leaf node w in anc(i, j), $K(w, f_w)$ and $\{K(u, f_u) | u \in children(w)\}$ are sum-consistent.
2. $f_a = t$.
3. If the user system is not in danger of completing an inference channel by learning $x_{i,j}$, then for all inference channels F∈C, there is some j'∈F such that j'≠j for which $K((i,j'),0) \in \pi$.

A dishonest user system will not be able to furnish a proof π to obtain $x_{i,j}$ when learning $x_{i,j}$ completes an inference channel F. Indeed, if the dishonest user system does not substitute K(w,z) for $K(w,f_w)$ for some $z \neq f_w$ and w∈Sibanc(i, j), the third property described above cannot hold. On the other hand, by the invariant described above, if the dishonest system substitutes K(w,z for K(w, $f_w$) for some $z \neq f_w$ for some node w, then is necessarily less than $f_w$ and properties (1) and (2) cannot hold simultaneously.

For user privacy, the user system cannot simply give π to the server system. Instead, the user system proves knowledge of π via a secure function evaluation (SFE) circuit. The user system inputs π to the SFE circuit, which will give the user system a certain secret if and only if π is a valid proof. If the server were to use truly random keys, the server would have to input all possible user keys into the SFE circuit to perform the comparisons since the server cannot know which keys the user system will use. However, this problem is avoided by making the keys dependent upon each other through the use of a non-malleable encryption scheme. Intuitively, all of the keys appear to be independent of each other, unless one key has a special, master key. This approach allows less communication overhead, as the server need only give the master key to the SFE circuit.

User System for Providing Private Inference Control

Figure 12:
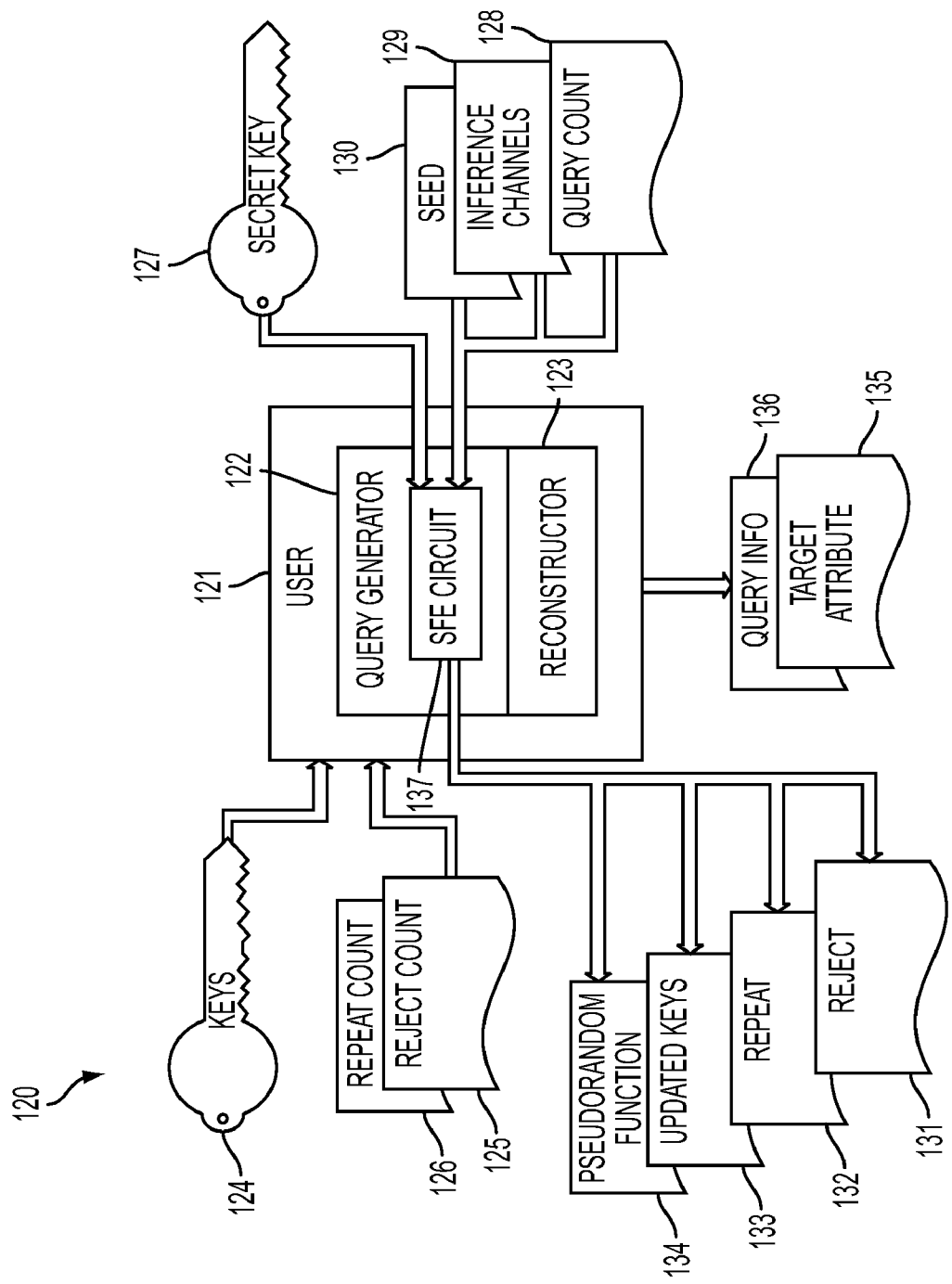
FIG. 12 is a block diagram showing a user system for providing private inference control, in accordance with a further embodiment.

FIG. 12 is a block diagram 120 showing a user system 121 for providing private inference control, in accordance with a further embodiment. The user system 121 maintains a set of keys 124 hierarchically structured into a balanced binary tree, as described above with reference to FIG. 11. Each key 124 reflects the node and frequency count corresponding to a record and attribute in the database. In addition, the user system 121 maintains a reject count 125 and repeat count 126 respectively reflecting failed and duplicated queries.

The user system 121 includes a query generator 122 and reconstructor 123. The query generator 122 includes a secure function evaluation (SFE) circuit 137, which receives inputs from the user system 121 that include a set of keys 124, record i, attribute index j, a reject count 125, and repeat count 126. The SFE circuit 137 also receives inputs from the server system that include a secret key 127, query count 128, set of inference channels 129, and seed value 130, which is used for a pseudorandom function. The SFE circuit 137 outputs a set of updated keys 133 and pseudorandom function 134 if the set of keys 124 is sum-consistent, as further described below with reference to FIG. 17. Otherwise, the SFE circuit 137 outputs a non-malleably encrypted reject count 131 or repeat count 132, as applicable. The query generator 122 generates query information 136, which is provided to the server. The reconstructor 123 recovers the target attribute 135 upon successfully receiving a pseudorandom function 134 from the SFE circuit 137, as further described below with reference to FIG. 19.

Server System for Providing Private Inference Control

Figure 13:
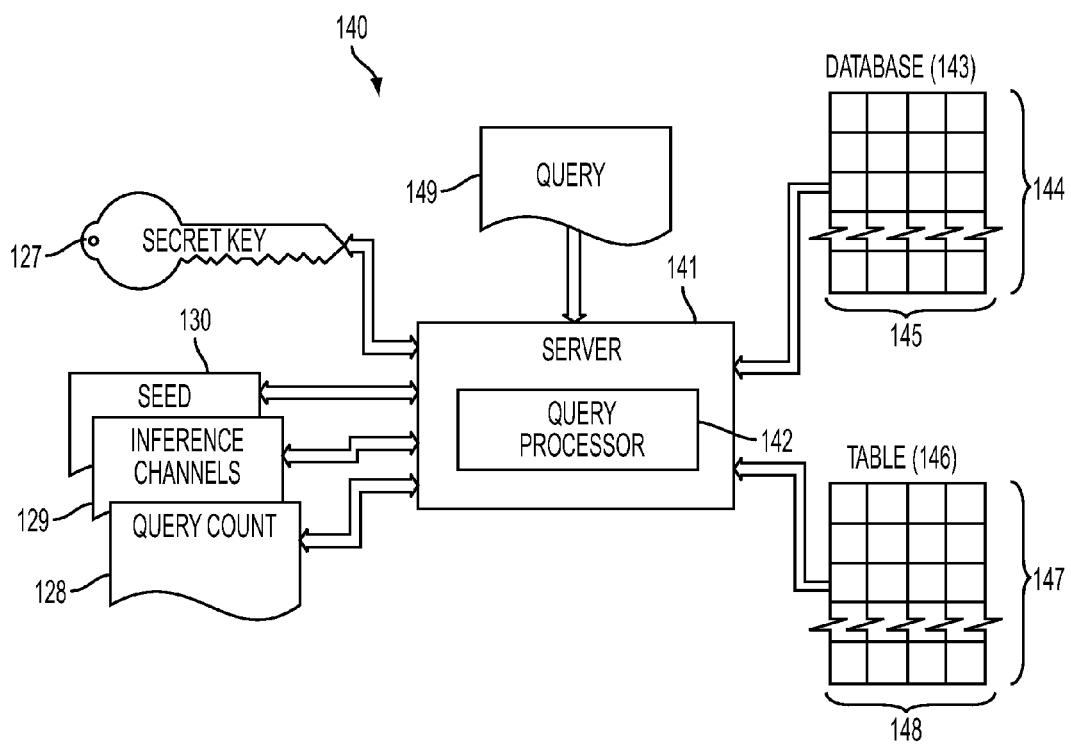
FIG. 13 is a block diagram showing a server system for providing private inference control, in accordance with a further embodiment.

FIG. 13 is a block diagram 140 showing a server system 141 for providing private inference control, in accordance with a further embodiment. The server system 141 includes a query processor 142 that forms a table 146 that includes records 147 and attributes 148 corresponding to the records 144 and attributes 145 of the database 143, as further described below with reference to FIG. 18. The query processor 142 also that maintains a query count 128 for the user system 121 and a secret key 127 and seed 130 that are provided to the secure function evaluation circuit 137 of the user system 121, along with the set of inference channels 129.

Private Inference Control Method

Figure 14:
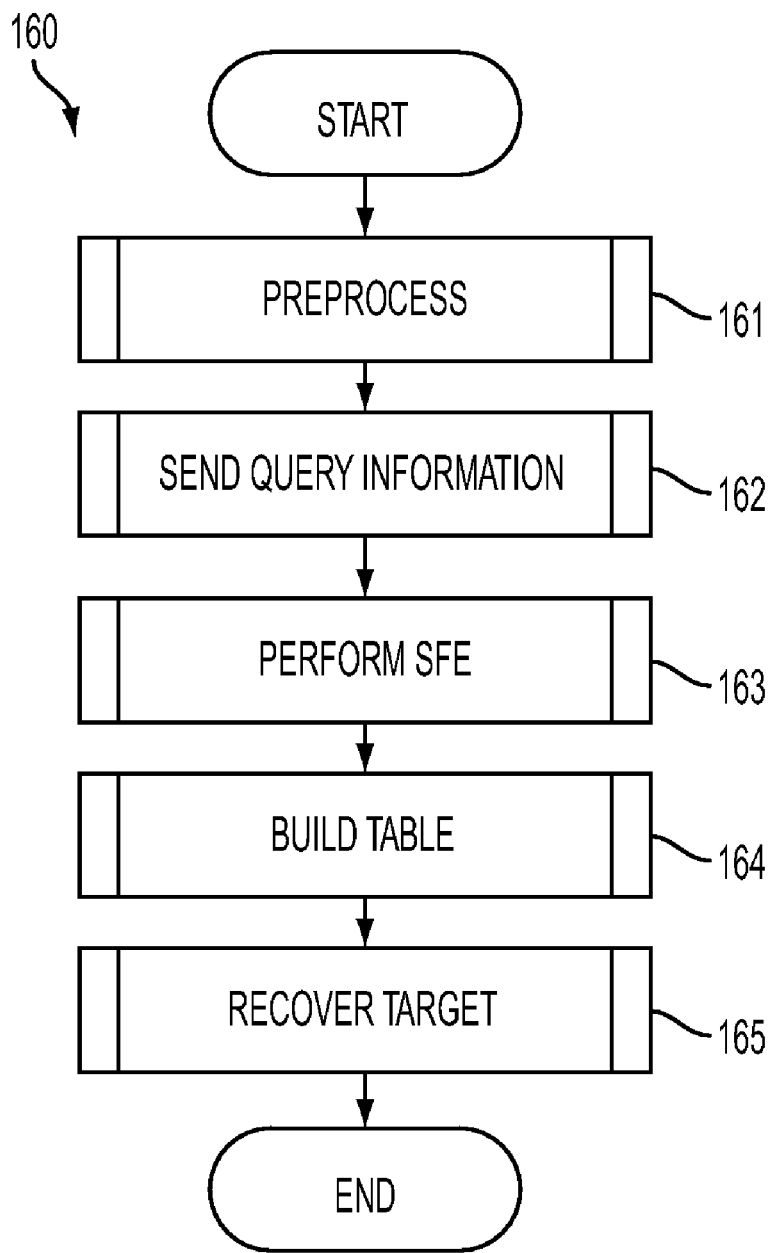
FIG. 14 is a flow diagram showing a method for providing private inference control, in accordance with a further embodiment.

FIG. 14 is a flow diagram 160 showing a method for providing private inference control, in accordance with a further embodiment. The purpose of the method is to provide private inference control by maintaining a balanced binary tree of keys corresponding to records and attributes in the database and by confirming permissible query counts through sum-consistency performed through a secure function evaluation. The method is described as a sequence of process operations or steps, which can be executed, for instance, by a user system 121 and server system 141.

Initially, the server system 141 performs preprocessing (block 161) to choose a seed for a pseudorandom function, as further described below with reference to FIG. 15. The user system 121 then generates query information 136 (block 162), as further described below with reference to FIG. 16. The user system 121 executes a secure function evaluation using inputs from both the user system 121 and server system 141 (block 163), as further described below with reference to FIG. 17. The server system 141 builds a table of entries (block 164), as further described below with reference to FIG. 18. Finally, the user system 121 recovers the target attribute 135 (block 165), as further described below with reference to FIG. 19.

Preprocessing

Figure 15:
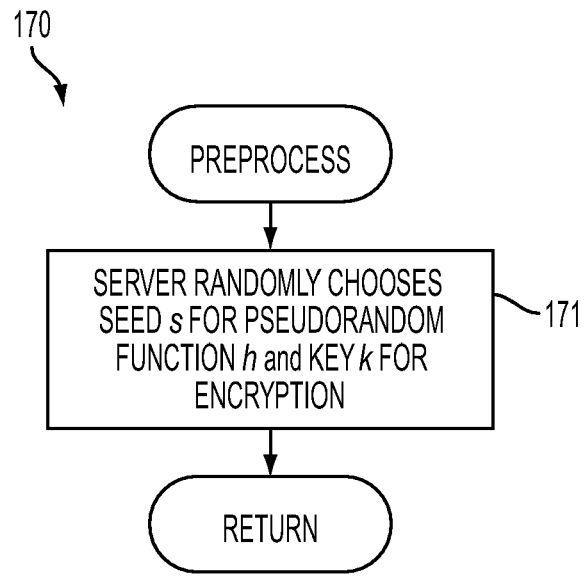
FIG. 15 is a flow diagram showing a routine for performing preprocessing for use in the method of FIG. 14.

FIG. 15 is a flow diagram 170 showing a routine for performing preprocessing for use in the method of FIG. 14. The purpose of this routine is to select a seed and encryption key.

The server system 141 randomly chooses a seed s for a pseudorandom function h and a key k for a non-malleable encryption scheme 1 (block 171).

Generating Query Information

Figure 16:
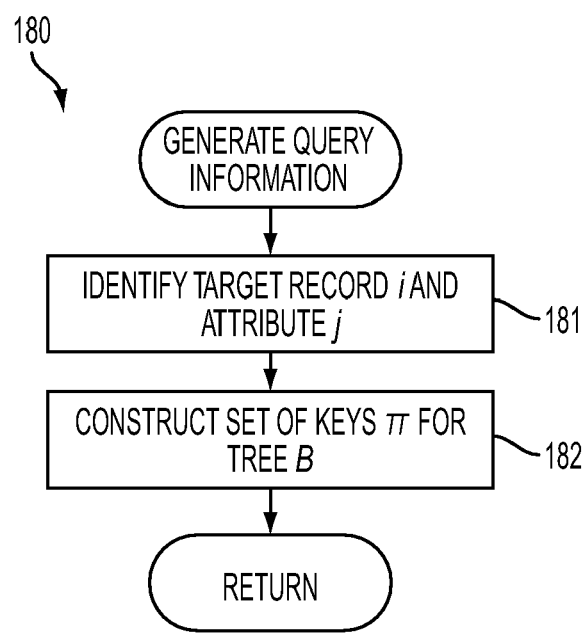
FIG. 16 is a flow diagram showing a routine for generating query information for use in the method of FIG. 14.

FIG. 16 is a flow diagram 180 showing a routine for generating query information 136 for use in the method of FIG. 14. The purpose of this routine is to construct the balanced binary tree 151 storing the keys 124 corresponding to the attributes 145 stored in the database 143.

Initially, the user system 121 identifies a target record i and attributed (block 181). The user system 121 next constructs a set of keys $\pi=\{K(w,f_w)|w \in \text{sibanc}(i,j)\}$ for the tree B (block 182).

Secure Function Evaluation Performance

Figure 17:
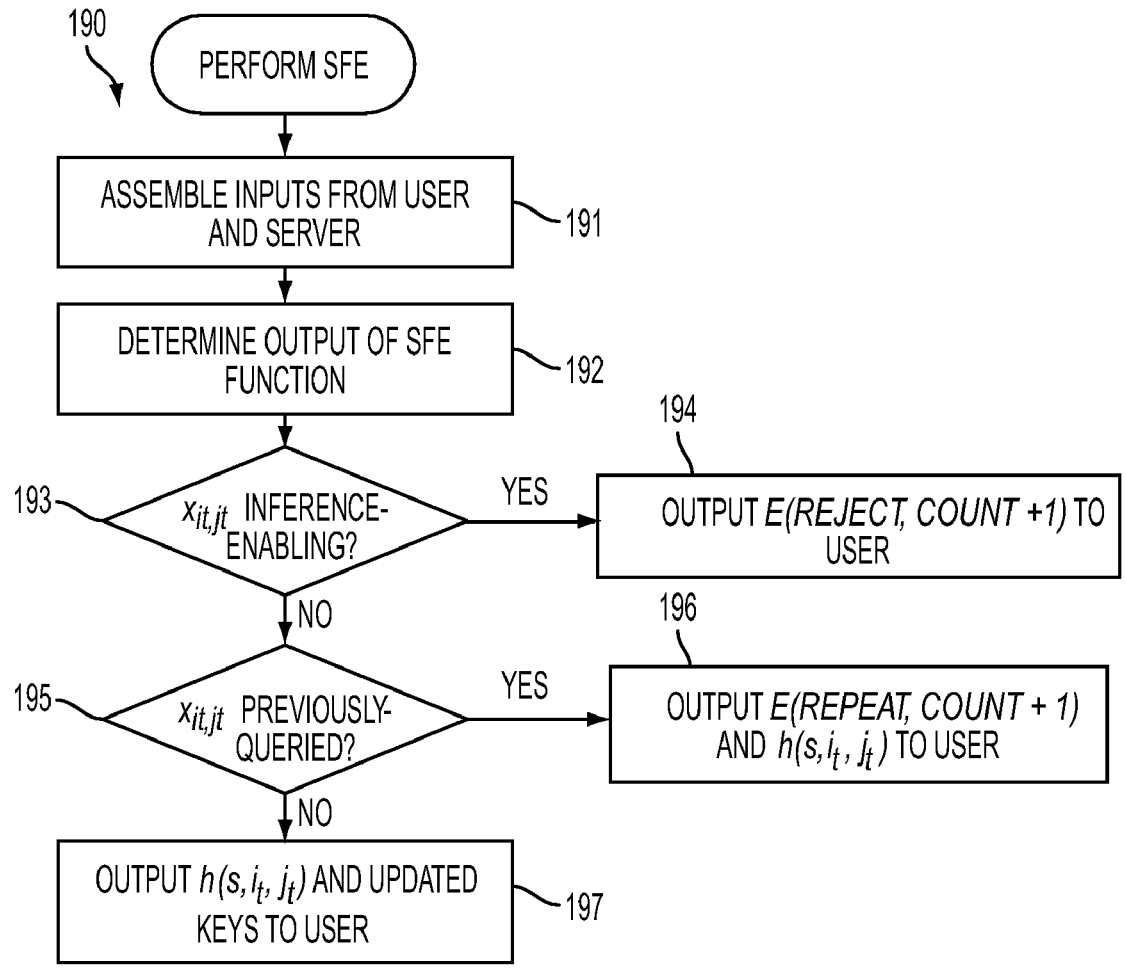
FIG. 17 is a flow diagram showing a routine for performing a secure function evaluation for use in the method of FIG. 14.

FIG. 17 is a flow diagram 190 showing a function for performing a secure function evaluation 137 for use in the method of FIG. 14. The purpose of this function is to generate an output from a secure function evaluation, such as described in S. Goldreich et al., "How to Play Any Mental Game," Proc. of $19^{th}$ STOCL, pp. 218-229 (1987), and A. C. Yao, "Protocols for Secure Computations," Proc. of $23^{rd}$ FOCS, pp. 160-164 (1982), the disclosure of which are incorporated by reference.

Initially, the inputs from the user system 121, which include the set of keys $\pi=\{K(w, f_w)|w \in \text{sibanc}(i,j)\}$, record index i∈[n], attribute index j∈[m], and two k-bit numbers p, q, which, if the user system 121 is honest, denote $E_K$("reject", $z_1$) and $E_K$ ("repeat", $z_2$) for some integers $z_1$ and $z_1$ (block 191). The inputs from the server system 141 include the secret key K, cumulative total number of queries t, collection of inference channels C and seed s to the pseudorandom function h. The output of the secure function evaluation is then determined as follows (block 192).

Let C be a secure circuit implementing the functionality of the secure function evaluation. U constructs the set of keys $\pi=\{K(w, f_w)|w \in \text{sibanc}(i_t, j_t)\}$, and feeds these keys along with keys $E_K$ ("reject", $z_1$) and $E_K$ ("repeat", $z_2$) into C where $z_1$, $z_2$ denote the number of rejected and repeated queries made thus far. If no such queries have been made in one of these two cases, that is, $z_1$ or $z_2$ are 0, then U substitutes a random value in the range of E. S then feeds s, K, and the inference channels C into C. S gets no Output from C, while U's Output is divided into the following cases:

(a) If learning $x_{i_t,j_t}$ is inference-enabling (block 193), U's output is E("reject", $z_t$+1) (block 194).
(b) If $x_{i_t,j_t}$ was previously queried (block 195), U's output is E("repeat", $z_2$+1) together with h(s, $i_t,j_t$) (block 196).
(c) Otherwise (U's Output is h(s $i_t$, $j_t$) and the updated keys $\{K(w, f_w+1)|K(w, f_w) \in \pi\}$ (block 197).

Table Building

Figure 18:
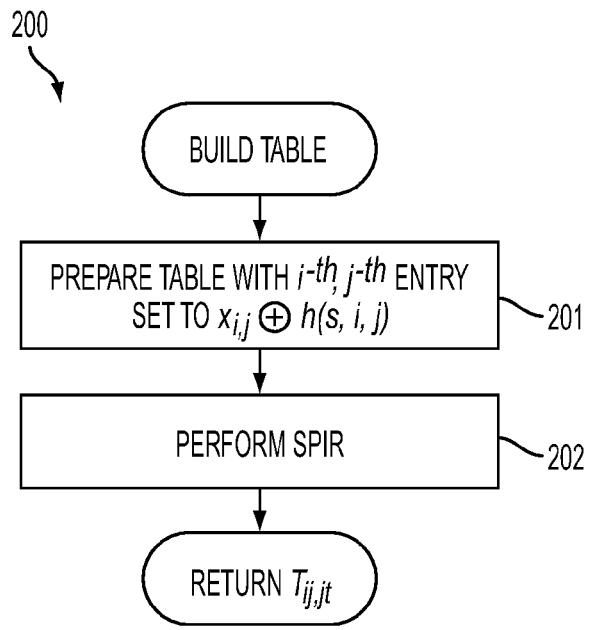
FIG. 18 is a flow diagram showing a routine for building a table for use in the method of FIG. 14.

FIG. 18 is a flow diagram 200 showing a function for building a table 146 for use in the method of FIG. 14. The purpose of this routine is to fill the table 146 with entries corresponding to the attributes 145 of the database 143.

The server system 141 prepares the table 146 by generating each ith and jth entry set to $x_{i,j} \oplus h(s, i, j)$ (block 201). The user system 121 and server system 141 then engage in an SPIR protocol (block 202) and the server system 141 returns the encrypted attribute $T_{i_t,j_t}$.

Target Attribute Recovery

Figure 19:
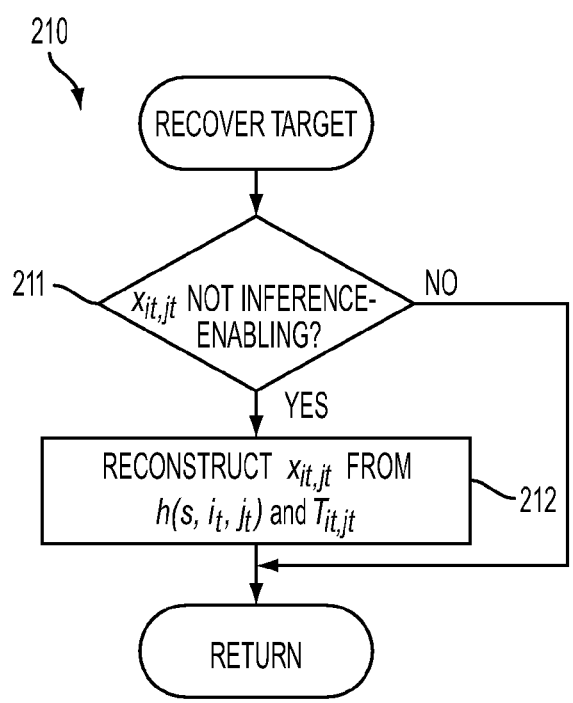
FIG. 19 is a flow diagram showing a routine for recovering a target attribute for use in the method of FIG. 14.

FIG. 19 is a flow diagram 210 showing a routine for recovering a target attribute 135 for use in the method of FIG. 14. The purpose of this routine is to recover the requested target attribute 135.

If learning $x_{i_t,j_t}$ is not inference-enabling (block 211), the user system 121 reconstructs $x_{i_t,j_t}$ from $h(s, i_t, j_t)$ and $T_{i_t,j_t} = x_{i_t,j_t} \oplus (D\ h(s, i_t, j_t)$ (block 212).

While the invention has been particularly shown and described as referenced to the embodiments thereof, those skilled in the art will understand that the foregoing and other changes in form and detail may be made therein without departing from the spirit and scope.

What is claimed is:

1. A client-implemented system for providing private inference control, comprising:
    a client comprising a central processing unit and a memory within which code for execution by the central processing unit is stored, comprising:
        a query module to access a secure database on a server comprising a plurality of records with each record comprising a plurality of attributes, to specify a plurality of queries by encrypting indices, which identify one such record and attribute by homomorphic encryption, and to transmit the encrypted indices to the server;
        a query generator configured to receive a plurality of query responses, which each comprise a homomorphically encrypted attribute maintained in a table on the server by executing a Symmetric Private Information Retrieval (SPIR) protocol with the server; and
        a reconstructor configured to receive a sequence of randomly generated key shares encrypted by homomorphic encryption, to decrypt a plurality of the key shares comprising a number of the key shares sufficient to recover a secret key subject to a non-inference enabling query, and to recover a secure database entry by specifying the correct encrypted indices against the table upon recovering the secret key.

2. The client-implemented system according to claim 1, wherein the query generator is further configured to execute a zero knowledge proof of knowledge that ciphertexts are well-formed.

3. The client-implemented system according to claim 1, wherein the query generator is further configured to form a public key and private key, and provides the public key to the secure database.

4. A client-implemented method for providing private inference control, comprising the steps of:
    accessing a secure database provided on a server and comprising a plurality of records with each record comprising a plurality of attributes;
    specifying a plurality of queries by encrypting indices identifying one such record and attribute for each query, by homomorphic encryption and transmitting the encrypted indices to the server;
    receiving a sequence of key shares randomly generated on the server, which are each encrypted by homomorphic encryption;
    receiving a plurality of query responses, which each comprise a homomorphically encrypted attribute maintained in a table on the server by executing a Symmetric Private Information Retrieval (SPIR) protocol with the server;
    decrypting a plurality of the key shares comprising a number of the key shares sufficient to recover a secret key subject to a non-inference enabling, query; and
    recovering the secure database entry by specifying the correct encrypted indices against the table upon recovering the secret key,
    wherein the steps are performed on a suitably-programmed computer.

5. The client-implemented method according to claim 4, further comprising: executing a zero knowledge proof of knowledge that ciphertexts are well-formed.

6. The client-implemented method according to claim 4, further comprising: forming a public key and private key; and providing the public key to the secure database.

7. A non-transitory computer readable storage medium storing code for executing on a computer system to perform the client-implemented method according to claim 4.

8. A server-implemented system for providing private inference control, comprising:
    a server comprising a central processing unit and a memory within which code for execution by the central processing unit is stored, comprising:
        a secure database comprising a plurality of records with each record comprising a plurality of attributes;
        a plurality of queries specified by a client system that each comprise encrypted indices, which identify one such record and attribute by homomorphic encryption;
        a query count of the queries;
        an authorization generator configured to generate a secret key upon reaching the query count, to divide the secret key into randomly generated key shares and to provide a sequence of the key shares encrypted by homomorphic encryption to the client system; and
        a query processor configured to form a table of entries by encrypting the indices, the secret key and each of the attributes for each of the records of the database and to provide the attributes as query responses through an execution of a Symmetric Private Information Retrieval (SPIR) protocol with the client system.

9. The server-implemented system according to claim 8, wherein the authorization generator is further configured to set an empty secret key prior to reading the query count.

10. The server-implemented system according to claim 8, wherein the query processor is further configured to generate a random value for the indices identifying each of the records and attributes in the secure database, and to include the random value with the homomorphic encryption of each such table entry corresponding to each such index.

11. The server-implemented system according to claim 9, wherein the key shares sequence are formed comprising a subset of the query count, and the key shares are recovered upon receiving the key shares sequence.

12. A server-implemented method for providing private inference control, comprising the steps of:
    maintaining a secure database comprising a plurality of records with each record comprising a plurality of attributes;
    receiving a plurality of queries generated by a client system comprising homomorphically encrypted indices identifying one such record and attribute for each query;
    maintaining a query count of the queries;
    generating a secret key upon reaching the query count;

dividing the secret key into randomly generated key shares and providing a sequence of key shares, which are each encrypted by homomorphic encryption to the client system;

forming a table of entries by encrypting the indices, the secret key and each of the attributes for each of the records of the databases;

executing a Symmetric Private Information Retrieval (SPIR) protocol with the client system on the table of entries; and providing a plurality of query responses to the client system, which each comprise the attributes for each of the records of the table of entries, wherein the steps are performed by a suitably-programmed computer.

13. The server-implemented method according to claim 12, further comprising: setting an empty secret key prior to reading the query count.

14. The server-implemented method according to claim 12, further comprising: generating a random value for the indices identifying each of the records and attributes in the secure database; and including the random value with the homomorphic encryption of each such table entry corresponding to each such index.

15. A non-transitory computer readable storage medium storing code for executing on a computer system to perform the server-implemented method according to claim 12.

16. The server-implemented method according to claim 13, further comprising: forming the key shares sequence comprising a subset of the query count; and recovering the key shares upon receiving the key shares sequence.

* * * * *